(12) United States Patent
Wen et al.

(10) Patent No.: US 9,107,233 B2
(45) Date of Patent: Aug. 11, 2015

(54) RESOURCE SCHEDULING METHOD, SCHEDULER AND BASE STATION

(75) Inventors: Pingping Wen, Shanghai (CN); Mingli You, Shanghai (CN); Shaoquan Wu, Shanghai (CN); Fanglei Sun, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 290 days.

(21) Appl. No.: 13/202,908

(22) PCT Filed: Feb. 24, 2009

(86) PCT No.: PCT/CN2009/000194
§ 371 (c)(1),
(2), (4) Date: Aug. 23, 2011

(87) PCT Pub. No.: WO2010/096946
PCT Pub. Date: Sep. 2, 2010

(65) Prior Publication Data
US 2011/0300873 A1   Dec. 8, 2011

(51) Int. Cl.
*H04Q 7/10* (2006.01)
*H04W 72/12* (2009.01)

(52) U.S. Cl.
CPC ............................... *H04W 72/1226* (2013.01)

(58) Field of Classification Search
CPC ............ H04W 52/241; H04W 52/242; H04W 52/245; H04W 72/1247
USPC ............... 370/395.4, 468, 328–331, 332–333; 455/450, 422, 442–444
See application file for complete search history.

(56) References Cited

U.S. PATENT DOCUMENTS

| 5,923,650 | A  | * | 7/1999 | Chen et al. ..................... 370/331 |
| 8,213,951 | B2 | * | 7/2012 | Brisebois et al. ........... 455/452.2 |
| 8,311,001 | B2 | * | 11/2012 | Kimura et al. ................ 370/329 |
| 2008/0075027 | A1 | | 3/2008 | Lee et al. |

FOREIGN PATENT DOCUMENTS

| CN | 1571324 A | 1/2005 |
| CN | 1905549 A | 1/2007 |
| CN | 101064905 A | 10/2007 |

(Continued)

OTHER PUBLICATIONS

International Search Report for PCT/CN2009/000194 dated Dec. 3, 2009.

*Primary Examiner* — Patrick Edouard
*Assistant Examiner* — Julio Perez
(74) *Attorney, Agent, or Firm* — Fay Sharpe LLP (57) ABSTRACT

The present invention proposes a distributed probabilistic dynamic interference coordination scheme to decrease or eliminate inter-cell interference, wherein the mechanism of ALOHA is introduced into the dynamic interference coordination. According to the first aspect of the present invention, a resource scheduling method is proposed, comprising: selecting resource to be scheduled from a scheduling list; selecting a first user equipment to be scheduled from the scheduling list; allocating the selected resource to the first user equipment by probability of p, wherein 0≤p≤1, if the first user equipment is of edge user. The present invention further proposes a scheduler implementing the aforesaid resource scheduling method and a base station (BS) comprising the aforesaid scheduler.

15 Claims, 4 Drawing Sheets

(56) References Cited

FOREIGN PATENT DOCUMENTS

| CN | 101183888 A | 5/2008 |
| CN | 101304594 A | 11/2008 |
| EP | 2 445 291 A2 | 4/2012 |
| KR | 10-2009-0018730 | 2/2009 |

* cited by examiner

RESOURCE SCHEDULING METHOD, SCHEDULER AND BASE STATION

FIELD OF THE INVENTION

The present invention relates to mobile communication field, specifically to a distributed probabilistic dynamic interference coordination scheme, wherein the mechanism of ALOHA is introduced into the dynamic interference coordination, thereby providing a resource scheduling method, a scheduler implementing the aforesaid resource scheduling method and a base station (BS) comprising the aforesaid scheduler.

BACKGROUND OF THE INVENTION

In LTE (Long Term Evolution) system, the orthogonal frequency division multiple access (OFDMA) and single carrier FDMA (SC-FDMA) technologies are adopted in the downlink and uplink respectively. In LTE-advanced system, these multiple access technologies are still the candidate schemes. The inter-cell interference is the main limitation factor for capacity in such systems with low frequency reuse factor. If a mobile station is located at the cell boundary, interference from neighboring cells is a crucial factor leading to severe performance degradation (especially throughput and coverage).

Static and semi-static coordination technologies are the usual interference coordination technologies in LTE proposals. These inter-cell interference coordination technologies propose restrictions for a coordinating way between cells. For example, these restrictions may be in the form of restrictions to time/frequency resources available to the resource manager, or restrictions on the transmit power applicable to may certain time/frequency resources.

Figure 1:
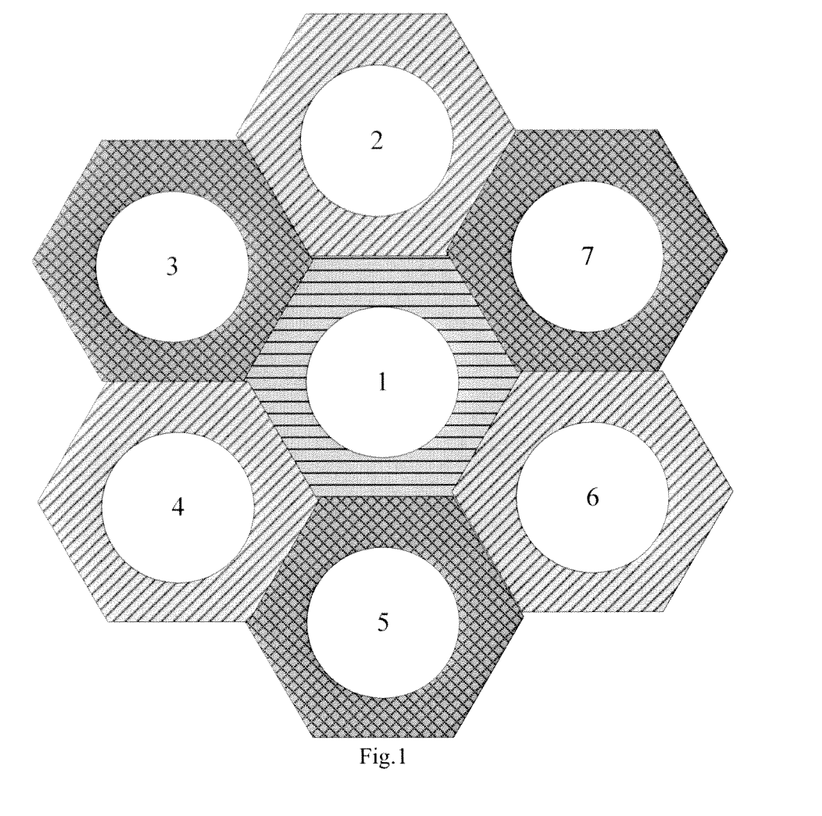
FIG. 1 shows a schematic diagram of the frequency reuse scheme proposed by the reference [1]

A static solution is proposed in reference [1]. FIG. 1 shows the frequency reuse scheme of this proposal. As shown in FIG. 1, seven cells are shown, cells 2 to 7 are adjacent cells of cell 1. In order to decrease or eliminate most of the interference, on the edge of cells, the frequencies should be orthogonal between neighbor cells, and in order to increase the utilization ratio of frequency resource, the frequency reuse factor should be increased as much as possible. For example, on the edge of each cell, cell 1 uses frequency 1, cell 2, 4 and 6 use the same frequency 2, cell 3, 5 and 7 use the same frequency 3. Cell-edge users transmit/receive with the full power. Cell-center users use the whole spectrum with restricted power to transmit/receive, and hence there will not be too much inter-cell interference (ICI) even the same frequency is used. However, there are two obvious disadvantages: (1) the frequency utilization rate of cell-edge users is only ⅓; (2) the solution may not be fulfilled optimally if the traffic load of the service changes.

Another static solution named as network power planning is proposed in reference [2], the whole frequency band is divided into several subsets with corresponding power, for example, 7 to 9 subsets. The frequency utilization rate of cell-edge users is 3/7 according to this proposal.

A semi-static scheme is proposed in reference [3]: the entire frequency band is divided into N sub bands, then X sub bands are used for cell-edge users and N−3X sub bands are used for cell-center users. The X sub bands used for cell-edge users are orthogonal in neighbor cells, while the N−3X sub bands used for cell-center users are the same in all cells. Only a part of spectrum is used in the inner cell and cell edge respectively in this scheme.

SUMMARY OF THE INVENTION

However, the aforesaid current technical scheme has disadvantages as follows:
(a) the aforesaid solution is either static solution, or semi-static solution needing network planning, and the semi-static solution needs additional signaling to indicate the occurrence of adjustment;
(b) in aforesaid solutions, the frequency reuse factor of cell-edge users is greater than 1, thereby decreasing spectrum efficiency;
(c) these solutions restrict scheduling and make scheduling more complex.

In view of the aforesaid problems, the present invention proposes a distributed probabilistic dynamic interference coordination scheme to decrease or eliminate ICI (Inter-cell interference), wherein the mechanism of ALOHA is introduced into the dynamic interference coordination.

According to a first aspect of the present invention, there is provided a resource scheduling method, comprising: selecting resource to be scheduled from a scheduling list; selecting a first user equipment to be scheduled from the scheduling list; allocating the selected resource to the first user equipment by probability of p, wherein $0 \leq p \leq 1$, if the first user equipment is of edge user.

Preferably, the method of resource scheduling may further comprise: allocating the selected resource to the first user equipment, if the first user equipment is not of edge user.

Preferably, the method of scheduling resource may further comprise: going back to the first user equipment selecting step and selecting a next first user equipment to be scheduled from the scheduling list, if the selected resource fails to be allocated to the first user equipment according to the probability of p.

Preferably, if the first user equipment is of edge user, prior to the probabilistic resource allocating step, the method of resource scheduling may further comprise: informing all of related base stations of the first user equipment with the information that resource is prepared to be allocated to the first user equipment; obtaining scheduling information from all the related base stations; performing the probabilistic resource allocating step, if it is determined that at least one related base station will probably allocate the resource, prepared to be scheduled to the first user equipment, to a second user equipment as edge user of the at least one related base station, according to scheduling information obtained from all of related base stations.

Preferably, the method of resource scheduling may further comprise: allocating the selected resource to the first user equipment, if it is determined that all of related base stations will not allocate the resource, prepared to be scheduled to the first user equipment, to the second user equipment.

Preferably, the first user equipment is of edge user, and the base station to which the non-service cell belongs is a related base station of the first user equipment, if pathloss difference between from the first user equipment to its serving cell and from the first user equipment to its non-service cell is less than predetermined threshold PLD_threshold.

Preferably, if signal interference ratio of the user equipment is less than a predetermined threshold SIR_threshold, the first user equipment is of edge user, and base station being adjacent to the serving base station of the first user equipment is of related base station of the first user equipment. More preferably, the predetermined threshold SIR_threshold is equal to Euler number e.

Preferably, the probabilistic resource allocating step may comprise: generating a random number $R \in (0, 1)$; allocating the selected resource to the first user equipment, if the generated random number R is less than the probability p.

Preferably, the probability p is preconfigured or dynamically adjustable.

Preferably, the scheduling list is determined according to scheduling algorithm.

According to a second aspect of the present invention, a scheduler implementing the aforesaid resource scheduling method is proposed, comprising: unit for selecting resource, configured to select resource to be scheduled from a scheduling list; unit for selecting user equipment, configured to select a first user equipment to be scheduled from the scheduling list; unit for determining edge user, configured to determine whether the first user equipment is of edge user; and unit for probabilistically allocating resource, configured to allocate the selected resource to the first user equipment by probability of p, wherein, $0 \leq p \leq 1$, wherein, if the unit for determining edge user determines the first user equipment is of edge user, the unit for probabilistically allocating resource allocates the resource, selected by the unit for selecting resource to the first user equipment by the probability of p.

Preferably, if the unit for determining edge user determines the first user equipment is not of edge user, the unit for probabilistically allocating resource allocates the resource, selected by the unit for selecting resource, to the first user equipment.

Preferably, if the unit for probabilistically allocating resource fails to allocate, according to the probability of p, the resource, selected by the unit for selecting resource, to the first user equipment, the unit for selecting user equipment selects a next first user equipment to schedule from the scheduling list.

Preferably, the scheduler may further comprise: unit for informing resource allocating information, configured to inform all of related base stations of the first user equipment with the information that resource is prepared to be allocated to the first user equipment if the unit for determining edge user determines the first user equipment is of edge user; unit for receiving scheduling information, configured to obtain scheduling information from all of related base stations; unit for determining related base station allocation, configured to determine whether all of related base stations will probably allocate the resource, prepared to be scheduled to the first user equipment, to a second user equipment as edge user of the at least one related base station, according to scheduling information obtained from all of related base stations, wherein, if the unit for determining related base station allocation determines that at least one related base station will probably allocate the resource, prepared to be scheduled to the first user equipment, to a second user equipment as edge user of the at least one related base station, the unit for probabilistically allocating resource allocates the resource, selected by the unit for selecting resource, to the first user equipment by the probability of p.

Preferably, if the unit for determining related base station allocation determines that all of related base stations will not allocate the resource, prepared to be scheduled to the first user equipment, to the second user equipment, the unit for probabilistically allocating resource allocates the resource, selected by the unit for selecting resource, to the first user equipment.

Preferably, the unit for determining edge user determines the first user equipment is of edge user and the base station to which the non-service cell belongs is a related base station of the first user equipment, if pathloss difference between from the first user equipment to its serving cell and from the first user equipment to its non-service cell is less than predetermined threshold PLD_threshold.

Preferably, the unit for determining edge user determines that the first user equipment is of edge user and base station being adjacent to the serving base station of the first user equipment is of related base station of the first user equipment, if signal interference ratio of the user equipment is less than a predetermined threshold SIR_threshold. More preferably, the predetermined threshold SIR_threshold is equal to Euler number e.

Preferably, the unit for probabilistically allocating resource comprises: the unit for generating random number, configured to generate a random number $R \in (0, 1)$; the unit for judging random number, configured to judge whether the generated random number is less than the probability of p; and the unit for allocating resource, configured to allocate the resource, selected by the unit for selecting resource, to the first user equipment if the generated random number is less than the probability of p.

Preferably, the probability p is preconfigured or dynamically adjustable.

Preferably, the scheduling list is determined according to scheduling algorithm.

According to a third aspect of the present invention, there is provided with a base station (BS) comprising the scheduler according to the second aspect of the present invention.

The present invention proposes a flexible distributed probabilistic dynamic interference coordination scheme to coordinate Inter-cell interference (ICI), especially advantageous for the system with low frequency reuse factor. The scheme proposed by the present invention is totally distributed and dynamic, and need not signaling exchange or relative little signaling exchange.

The advantages of the present invention:
(1) dynamic, distributed ICI coordination;
(2) simple, flexible, requiring no signaling exchange or relative little signaling exchange;
(3) thoroughly dynamic, requiring no the network planning;
(4) the frequency reuse factors of cell-center users and cell-edge users are all 1, the frequency selective gain may be obtained in scheduling.

BRIEF DESCRIPTION OF THE DRAWINGS

By the detailed description of the non-limiting embodiments with reference to the following drawings, the above or other objects, features and advantages of the present invention will become more apparent, wherein.

DETAILED DESCRIPTION OF EMBODIMENTS

Hereinafter, the present invention is described with reference to the drawings. In the following description, some detailed embodiments are only used for the aim of description, which should not be understood as any limitation to the present invention, but only as example. When it might be caused that the understanding of the present invention becomes ambiguous, the traditional structure or composition will be omitted.

The Principle Overview

According to the present invention, a distributed probabilistic dynamic interference coordination scheme is proposed, wherein the mechanism of ALOHA is introduced into the dynamic interference coordination. The basic idea of the present invention is:

(1) users may be divided into two kinds: center users and edge users; the judging criteria is as follows:

(A) determining according to long term CSI (comprising pathloss and shadow):

defining the threshold PLD_threshold for all of users:

if pathloss (comprising shadow) difference between from the user equipment i to its serving cell and from the first user equipment to its non-service cell is less than PLD_threshold, the user equipment i is regarded as edge user;

otherwise, the user equipment i is regarded as center user.

or (B) determining according to SIR of users:

defining the threshold SIR_threshold for all of users if SIR of the user equipment i≥SIR_threshold, the user equipment i is regarded as center user;

otherwise, the user equipment i is regarded as edge user;

the preferable value of SIR_threshold is Euler number e, and it has been proved (referring to reference [4]): scheduling the user equipment with SIR_threshold=e is the solution capable of maximizing the overall throughput of multiple cells.

(2) corresponding to two kinds of definitions (A) and (B) of edge users, the related base station definition as follows:

(A) if pathloss (comprising shadow) difference between from the user equipment i to its serving cell and from the first user equipment to its non-service cell is less than PLD) threshold, the base station to which the non-service cell belongs is defined as the related base station;

or (B) The neighboring base station (adjacent serving base station) within the first ring of the serving base stations will be defined as the related base station.

(3) For the center users, the interference from neighboring sectors is relative small and thus may be neglectable. Therefore, it is not necessary to do the dynamic interference coordination for the center users, this kind of user may be scheduled as usual.

(4) the edge users are the main contributor to ICI, thus the probabilistic dynamic interference coordination is adopted for the edge user.

Probabilistic Dynamic Interference Coordination Scheme (I) if the scheduler will allocate resource to the edge user A, the scheduler will allocate the resource to the edge user by the probability of p (0≤p≤1) and will not allocate the resource to the edge user by the probability of 1−p. If the edge user is not able to be scheduled according the random judgment, then the scheduler will try to allocate the resource to the next user in the scheduling list (determined by the scheduling algorithm).

(II) if the scheduler will allocate resource to the edge user A, it will inform the resource allocation information to all of related base stations of the edge user A, simultaneously the scheduler will obtain the scheduling information from all of related base stations.

(a) If the scheduler knows all of related base stations of the user will not allocate the resource to the edge user of the related base station, it will allocate the resource to the edge user A (by probability of 1).

(b) If the scheduler knows at least one related base station of the user might allocate the resource to the edge user B of the at least one related base station, the scheduler will allocate the resource to the edge user A by probability of p and will not allocate the resource to the edge user A by probability of 1−p. If the edge user is not able to be scheduled according the random judgment, then the scheduler will try to allocate the resource to the next user in the scheduling list (determined by the scheduling algorithm).

Figure 2:
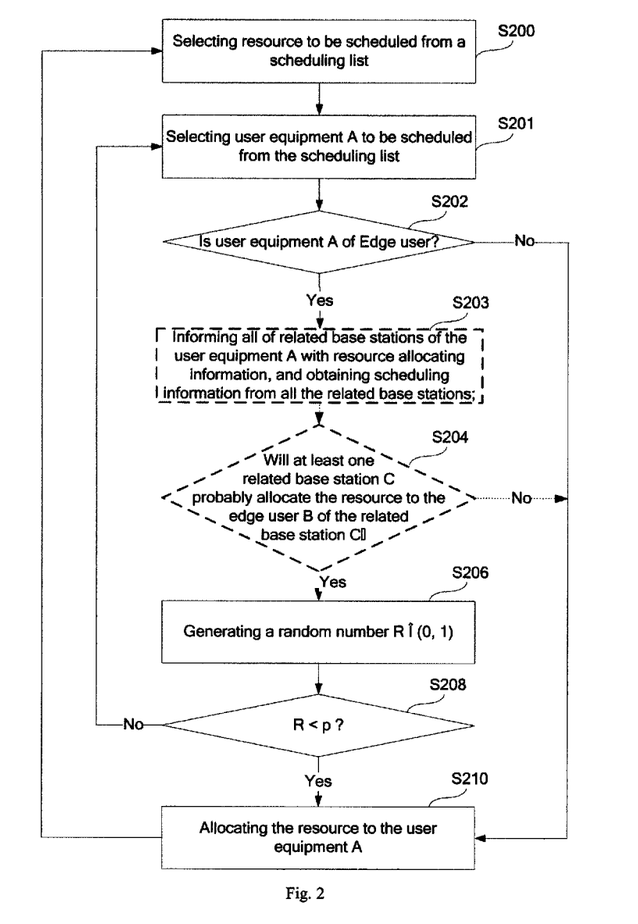
FIG. 2 shows a flow diagram of the resource scheduling method according to the present invention.

Specifically, FIG. 2 shows a detailed flow diagram of the resource scheduling method according to the present invention. Referring to FIG. 2, first, in the step S200, selecting resource to be scheduled from a scheduling list determined by the scheduling algorithm. In the step S201, selecting first user equipment A to be scheduled from the scheduling list determined by the scheduling algorithm. That is, the resource selected in the step S200 is prepared to be allocated to the first user equipment A selected in the step S201. In the step S202, determining whether the first user equipment A is of edge user, preferably, which may be determined according to section (1) of the aforesaid principle overview.

If it is determined that the first user equipment A is not edge user, then in the step S210, the resource, prepared to be scheduled to the first user equipment A, is allocated to the first user equipment A, after finishing the resource scheduling of the first user equipment A, turning to the step S200, selecting the next resource to be scheduled.

On the other hand, if it is determined that the first user equipment A is of edge user, then in the step S203, informing all of related base stations of the first user equipment A with the information that resource is prepared to be allocated to the first user equipment A, thus, the scheduling information is obtained from all the related base stations of the first user equipment A. In the step S204, determining whether all of related base station of the first user equipment A will allocate the resource, prepared to be scheduled to the first user equipment A, to a second user equipment as edge user of the related base station, according to scheduling information obtained from all of related base stations of the first user equipment A.

If it is determined that all of related base stations will not allocate the resource, prepared to be scheduled to the first user equipment A, to the second user equipment, then in the step S210, the resource, prepared to be scheduled to the first user equipment A, is allocated to the first user equipment, and the resource scheduling of the first user equipment A is finished, turning to the step S200, selecting the next resource to be scheduled.

On the other hand, if it is determined that at least one related base station C might allocate the resource, prepared to be scheduled to the first user equipment A, to a second user equipment B as edge user of the at least one related base station C, then in the step S206, a random number R∈(0,1) is generated. In the step S208, determining whether the generated random number R is less than the preconfigured or dynamically adjustable probability p (0≤p≤1). If it is determined that the generated random number R is less than the probability p, then in the step S210, the resource, prepared to be scheduled to the first user equipment A, is allocated to the first user equipment A, and the resource scheduling of the first user equipment A is finished, turning to the step S200, selecting the next resource to be scheduled.

On the other hand, if it is determined that the generated random number R is not less than the probability p, then it is determined that the resource selected in the step S200 can not be allocated to the first user equipment A selected in the step S201. This moment, back to the step S201 to select the next first user equipment A' to be scheduled from the scheduling list determined according to the scheduling algorithm. That is to try to allocate the resource selected in the step S200 to the next first user equipment A' reselected in the step S201.

It should be noted that the steps S203 and S204 for interacting information with related base station in FIG. 2 are not necessary to be performed. In case of simplicity, blind probabilistic resource scheduling may be performed, namely the steps S203 and S204 are omitted, when it is determined that the first user equipment is of edge user, a random judgment based on random number R and probability p is directly performed, and thus the resource probabilistic allocation according to the present invention is performed.

Figure 3:
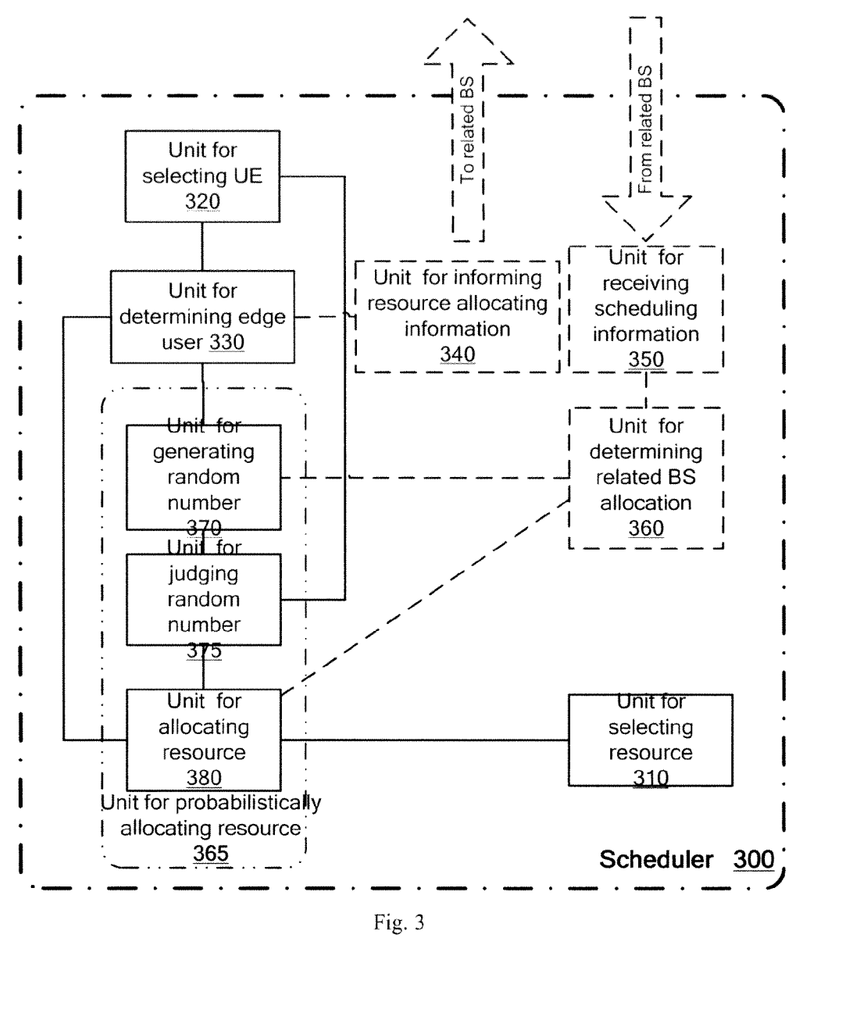
FIG. 3 shows a block diagram of the scheduler 300 according to the present invention.

FIG. 3 shows a detailed block diagram of the scheduler 300 according to the present invention.

Referring to FIG. 3, the scheduler 300 according to the present invention comprises: unit 310 for selecting resource, configured to select resource to be scheduled from a scheduling list determined according to the scheduling algorithm; unit 320 for selecting user equipment (UE), configured to select a first UE A to be scheduled from the scheduling list determined according to the scheduling algorithm, namely prepare to allocate the resource, selected by the unit 310 for selecting resource, to the first UE A selected by the unit 320 for selecting UE; unit 330 for determining edge user, configured to determine whether the first UE A is of edge user, preferably, which may be determined according to section (1) of the aforesaid principle overview part; unit 340 for informing resource allocating information, configured to inform all of related base stations of the first UE A with the information that resource is prepared to be allocated to the first UE if the unit 330 for determining edge user determines the first UE A is of edge user; unit 350 for receiving scheduling information, configured to obtain scheduling information from all of related base stations; unit 360 for determining related BS allocation, configured to determine whether all of related base stations will probably allocate the resource, prepared to be scheduled to the first UE A, to a second UE as edge user of the related BS, according to scheduling information obtained from all of related BSs; unit 365 for probabilistically allocating resource, configured to allocate the resource, selected by the unit 310 for selecting resource, to the first UE A selected by the unit 320 for selecting UE by preconfigured or dynamically adjustable probability of p ($0 \le p \le 1$). Unit 390 for probabilistically allocating resource may comprise: the unit 370 for generating random number, configured to generate a random number $R \in (0,1)$; unit 375 for judging random number, configured to judge whether the generated random number is less than the probability of p; and unit 380 for allocating resource, configured to allocate the resource, selected by the unit 310 for selecting resource, to the first UE A.

If the unit 330 for determining edge user determines the first UE A is not of edge user, the unit 380 for allocating resource allocates the resource, selected by the unit 310 for selecting resource, to the first UE A.

If the unit 330 for determining edge user determines the first UE A is of edge user, the unit 360 for determining related BS allocation performs operation.

If the unit 360 for determining related BS allocation determines that at least one related BS C will probably allocate the resource, prepared to be scheduled to the first UE A, to a second UE B of the at least one related BS C, the unit 370 for generating random number performs operation.

If the unit 375 for judging random number determines that the random number R, generated by the unit 370 for generating random number, is less than the probability of p, the unit 380 for allocating resource allocates the resource, selected by the unit 310 for selecting resource, to the first UE A.

If the unit 360 for determining related BS allocation determines that all related base stations will not allocate the resource, prepared to be scheduled to the first UE A, to the second UE, the unit 380 for allocating resource allocates the resource, selected by the unit 310 for selecting resource, to the first UE A.

If the unit 375 for judging random number determines that the random number R, generated by the unit 370 for generating random number, is not less than the probability of p, the unit 320 for selecting UE selects the next first UE A' to be scheduled from the scheduling list. That is, trying to allocate the resource, selected by the unit 310 for selecting resource, to the next first UE A' reselected by the unit 320 for selecting UE.

It should be noted that the units 340~360 of interacting information with related base station in FIG. 3 are not indispensable units. In the simple case of performing blind probabilistic resource scheduling, the units 340~360 may be omissible, when the unit 330 for determining edge user determines that the first UE A is of edge user, the unit 365 for probabilistically allocating resource directly performs operation.

Figure 4:
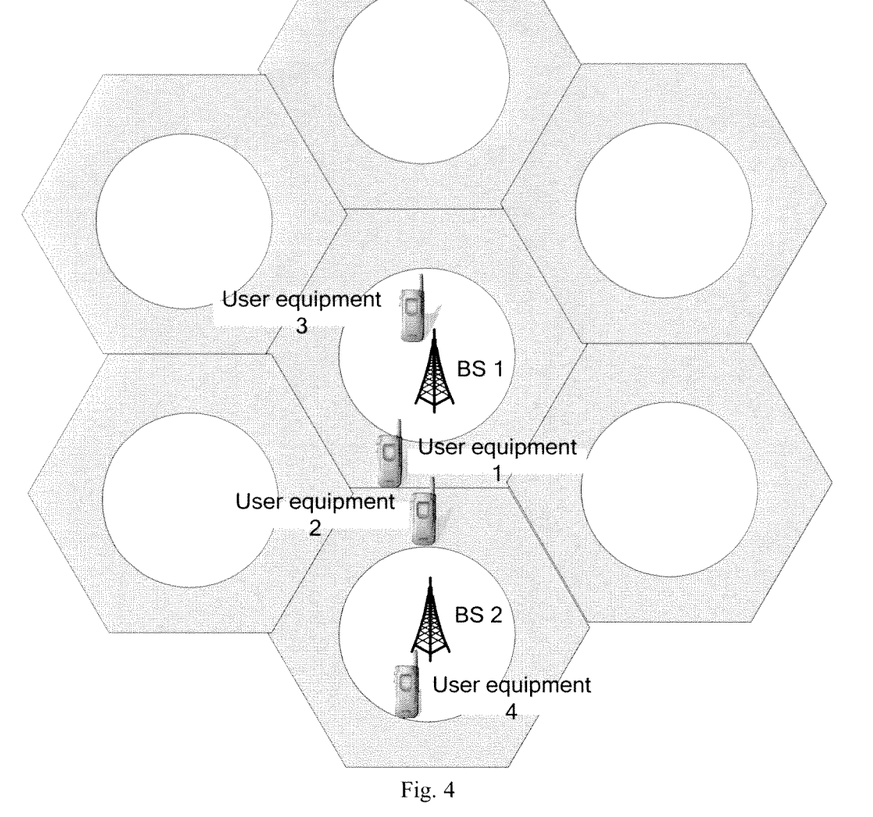
FIG. 4 shows a schematic diagram of application example of the present invention.

FIG. 4 shows an application example of the present invention, wherein BS 1 and BS 2 respectively comprise separate scheduler sub-system. The BS 1 is the serving BS of the user equipment 1 and 3, the BS 2 is the serving BS of the user equipment 2 and 4. The user equipment 1 and 2 are of edge user, and the user equipment 3 and 4 are of center user. In the application example, center user and edge user may be determined according to section (1) (A) of the aforesaid principle overview part. According to section (2) (A) of the aforesaid principle overview part, the related BS of the user equipment 1 is BS 2, and the related BS of the user equipment 2 is BS 1. If the user equipment 1 and 2 are scheduled at the same time, then the interference might be serious and the performance will be degraded. According to the present invention, BS 1 will notify BS 2 with the information that the edge user (the user equipment 1) will be scheduled and BS 2 will also inform BS 1 with the information that the edge user (the user equipment 2) will be scheduled. So the user equipment 1 (the user equipment 2) is scheduled by probability of p ($0 \le p \le 1$) and is not scheduled by probability of 1−p. If the user equipment 1 (the user equipment 2) is not scheduled, then the resource will be allocated to other user equipments, for example, user equipment 3 (user equipment 4). The probability that user equipment 1 and user equipment 2 are scheduled simultaneously decreases to p*p, thereby reducing effectively the interference, with the resource effectively reused by other user equipments.

Table 2 shows the performance comparison between the simulation result of the present invention and the prior art. For the purpose of simplicity, the blind probabilistic scheme (that is, the aforesaid steps S203 and 204 are omitted), wherein there is no information exchange between BSs, is adopted. If the edge user is scheduled, it will be allocated resource by probability of p and not be allocated by probability of 1−p. The simulation result shown in Table 2 is based on LTE uplink system. The detailed simulation parameters are shown in Table 1 (referring to reference [5]). The simulation result shows: the aforesaid blind probabilistic scheme according to the present invention may get 6% gain of the edge user throughput (5% throughput), with a little increase (1.4%) in the cell average throughput. Since the scheduling is done with blind information in the case of absence of information exchange between base stations, the gain is mainly from the probabilistically resource allocating of edge user proposed by the present invention (mainly based on the known information about whether there exists neighboring cell edge user transmitting the

TABLE 1

| Option | Description |
|---|---|
| Cellular Layout | ISD = 500, 19 Cells/57 sectors with wrapround |
| CenterFreq and BandWidth | 2 GHz and 10 MHz |
| Pathloss Model | 128.1 + 37.6 * log10(R) dB, R in kilo-meter |
| Shadowing Model | StdDev = 8 dB, CorrDis = 50 m |
| Fastfading Model | TU6 and SCM |
| BS Antenna | 2 antennas, 17 dBi gain, radiation Pattern = max {−12 * (AoA/70)^2, −20} (dB) |
| UE Antenna gain | 1 omni antenna, 0 dBi gain |
| BS Noise Factor | 4.5 dB |
| Max UE Tx power | 24 dBm |
| UE speed | 3 km/h |
| UE Distribution | Uniform in each sector (hexagon); MinDisToSite > 35 m |
| UE Number per sector | 20 |
| Traffic load model | Full buffer |

TABLE 2

| | No interference coordination | Dynamic interference coordination (p = 0.5) | gain |
|---|---|---|---|
| IoT (linear value) | 37.64 | 35.07 | |
| Cell throughput (Mpbs) | 12.52 | 12.7 | 1.4% |
| Edge throughput (kbps) | 193.4 | 205.3 | 6% |

The above embodiment is only for an exemplarily purpose and not intended to limit the present invention. The skilled in the art should understand that the present invention may be modified, replaced without departing from the scope and spirit of the present invention, with these modifications and replacements falling within the scope limited by appended claims.

REFERENCES LIST

[1] R1-050763, "Muting-Further Discussion and Results", Ericsson
[2] R1-05-0694, "Multi-cell Simulation Results for Interference Co-ordination in new OFDM DL", Alcatel, 3GPP TSG RAN WG1 #42, London, UK, 29 Aug.-2 Sep. 2005.
[3] R1-050738, Siemens, "Interference mitigation Considerations and Results on Frequency Reuse", RAN G1#42, London, UK, August/September 2005.
[4] Kiani, S. G.; Oien, G. E.; Gesbert, D. "Maximizing Multicell Capacity Using Distributed Power Allocation and Scheduling", Wireless Communications and Networking Conference, 2007. WCNC 2007. IEEE 11-15 Mar. 2007 Page(s): 1690-1694
[5] 3GPP TR 25.814 V7.0.0, Physical Layer Aspects for Evolved UTRA (Release 7), 2006

The invention claimed is:

1. A method of resource scheduling, comprising:
selecting a resource to be scheduled from a scheduling list including one or more resources to be scheduled;
selecting a first user equipment to be scheduled from a group of one or more user equipment; and
determining whether or not the first user equipment is in an edge condition indicative of being near an edge of a cell;
wherein when it is determined that the first user equipment is in an edge condition, then performing an allocating operation including:
generating a random value, said random value being generated by a unit provisioned to generate said random value;
comparing the generated random value to a probability value, wherein the probability value is at least one of a preconfigured or adjustable value representing a probability of the selected resource being allocated to the first user equipment; and
one of allocating or not allocating the selected resource to the first user equipment based on an outcome of the comparing.

2. The method of resource scheduling according to claim 1, further comprising:
allocating the selected resource to the first user equipment, when it is determined that the first user equipment is not of edge user.

3. The method of resource scheduling according to claim 1, further comprising:
going back to the user equipment selecting step and selecting a next first user equipment to be scheduled when the selected resource fails to be allocated to the prior selected first user equipment.

4. The method of resource scheduling according to claim 1, wherein,
when the first user equipment is in an edge condition, prior to performing the allocating operation, the method further comprises:
informing one or more related base stations of the selected first user equipment with information that the selected resource is prepared to be allocated;
obtaining scheduling information from one or more of the related base stations; and
performing the allocating operation, when it is determined from the obtained scheduling information that at least one related base station will probably allocate the resource, prepared to be allocated to the first user equipment, to a second user equipment in an edge condition with respect to the at least one related base station.

5. The method of resource scheduling according to claim 4, further comprising:
allocating the selected resource to the first user equipment, when it is determined from the obtained scheduling information that none of the related base stations will allocate the resource, prepared to be allocated to the first user equipment, to the second user equipment.

6. The method of resource scheduling according to claim 1, wherein,
the first user equipment is deemed in an edge condition, and a base station to which a non-service cell belongs is deemed a related base station of the first user equipment, when a pathloss difference between from the first user equipment to its serving cell and from the first user equipment to its non-service cell is less than a determined.

7. The method of resource scheduling according to claim 1, wherein,
when a signal interference ratio of the user equipment is less than a determined threshold, the first user equipment is deemed to be in an edge condition, and a base station being adjacent to a serving base station of the first user equipment is deemed to be a related base station of the first user equipment.

8. A resource scheduler including hardware comprising:
a resource selecting unit configured to select a resource to be scheduled from a scheduling list including one or more resources to be scheduled;
a user equipment selecting unit configured to select a first user equipment to be scheduled from a group of one or more user equipment;
an edge determining unit configured to determine whether or not the first user equipment is in an edge condition indicative of being near an edge of a cell; and
an allocating unit configured to selectively allocate the selected resource to the selected first user equipment, wherein, if the edge determining unit determines that the first user equipment is in an edge condition, then the allocating unit performs the operations of (i) generating a random value, wherein said allocating unit is provisioned to generate said random value, (ii) comparing the generated random value to a probability value, wherein the probability value is at least one of a preconfigured or adjustable value representing a probability of the selected resource being allocated to the first user equipment, and (iii) based on an outcome of the comparing operation, one of allocating or not allocating the resource selected by the resource selecting unit to the first user equipment selected by the user equipment selecting unit.

9. The scheduler according to claim 8, wherein,
if the edge determining unit determines that the first user equipment is not in an edge condition, then the allocating unit allocates the resource selected by the resource selecting unit to the first user equipment selected by the user equipment selecting unit.

10. The scheduler according to claim 9, wherein,
if the allocating unit fails to allocate the resource, selected by the resource selecting unit, to the first user equipment, the user equipment selecting unit selects a next first user equipment to schedule.

11. The scheduler according to claim 8, further comprising:
an informing unit configured to inform one or more related base stations of the first user equipment with information that the selected resource is prepared to be allocated to the first user equipment if the edge determining unit determines the first user equipment is in an edge condition;
a receiving unit configured to obtain scheduling information from the related base stations;
a related base station allocation determining unit configured to determine based on the received scheduling information whether at least one of the related base stations will probably allocate the resource, prepared to be allocated to the first user equipment, to a second user equipment in an edge condition with respect to the at least one related base station,
wherein, if the related base station allocation determining unit determines that at least one related base station will probably allocate the resource, prepared to be allocated to the first user equipment, to a second user equipment in an edge condition with respect to the at least one related base station, then the allocating unit performs its operations (i), (ii) and (iii).

12. The scheduler according to claim 11, wherein,
if the related base station allocation determining determines that none of related base stations will allocate the resource, prepared to be allocated to the first user equipment, to the second user equipment, the allocating unit allocates the resource, selected by the resource selecting unit, to the first user equipment without performing its operations (i), (ii) and (iii).

13. The scheduler according to claim 8, wherein,
the edge determining unit determines that the first user equipment is in an edge condition and a base station to which a non-service cell belongs is a related base station of the first user equipment, when a pathloss difference between from the first user equipment to its serving cell and from the first user equipment to its non-service cell is less than a determined threshold.

14. The scheduler according to claim 8, wherein,
the edge determining unit that the first user equipment is in an edge condition and a base station being adjacent to a serving base station of the first user equipment is a related base station of the first user equipment, if a signal interference ratio of the first user equipment is less than a determined threshold.

15. A base station, comprising the scheduler according to claim 8.

* * * * *